US012769497B2

(12) United States Patent
Fukao et al.

(10) Patent No.: US 12,769,497 B2
(45) Date of Patent: Oct. 20, 2026

(54) DISPLAY SYSTEM AND DISPLAY METHOD

(71) Applicant: TOYOTA JIDOSHA KABUSHIKI KAISHA, Toyota (JP)

(72) Inventors: Hidekuni Fukao, Owariasahi (JP); Kazuho Saeki, Kawasaki (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

(21) Appl. No.: 19/223,283

(22) Filed: May 30, 2025

(65) Prior Publication Data

US 2026/0104834 A1 Apr. 16, 2026

(30) Foreign Application Priority Data

Oct. 10, 2024 (JP) ................................ 2024-178246

(51) Int. Cl.
*G06F 3/14* (2006.01)
*G09G 5/00* (2006.01)

(52) U.S. Cl.
CPC ................ *G06F 3/14* (2013.01); *G09G 5/00* (2013.01)

(58) Field of Classification Search
CPC .................................... G06F 3/14; G09G 5/00
See application file for complete search history.

(56) References Cited

U.S. PATENT DOCUMENTS 6,118,480 A * 9/2000 Anderson .......... H04N 1/32128 348/207.99
6,657,658 B2 * 12/2003 Takemura .......... H04N 1/00204 348/222.1
6,940,545 B1 * 9/2005 Ray ...................... H04N 23/611 348/222.1
7,453,506 B2 * 11/2008 Li ........................ H04N 23/632 348/169
8,051,386 B2 * 11/2011 Rosander ............... G16H 50/20 715/810
11,184,549 B2 * 11/2021 Yamaguchi ............ H04N 23/63
2003/0151688 A1 * 8/2003 Tojo ................... H04N 1/00461 348/333.05
2003/0234876 A1 * 12/2003 Bloom .................. H04N 5/772 386/E5.072
2004/0227836 A1 * 11/2004 Tanaka ................... H04N 1/393 348/333.12
2005/0025390 A1 * 2/2005 Tsujii ..................... G16H 30/20 600/300

(Continued)

FOREIGN PATENT DOCUMENTS

JP 2015-210491 A 11/2015

*Primary Examiner* — Benyam Ketema
(74) *Attorney, Agent, or Firm* — SoraIP, Inc.

(57) ABSTRACT

A display system according to the present disclosure includes an acquisition unit that acquires image data of a sample to be analyzed, an image processing unit that performs image processing on the image data, and a display control unit that displays an image display region divided into a first region and a second region at a boundary line. The display control unit displays the boundary line so as to be movable by a user operation, displays a portion corresponding to the position of the first region among the image data before the image processing is executed in the first region, and displays a portion corresponding to the position of the second region among the image data after the image processing is executed in the second region.

3 Claims, 6 Drawing Sheets

(56) References Cited

U.S. PATENT DOCUMENTS

| | | | | |
|---|---|---|---|---|
| 2007/0229491 | A1* | 10/2007 | Saitoh | H04N 1/00461 345/418 |
| 2009/0167961 | A1* | 7/2009 | Suzuki | G09G 5/00 348/E9.037 |
| 2009/0195542 | A1* | 8/2009 | Kawamura | G09G 5/14 345/422 |
| 2009/0276731 | A1* | 11/2009 | Yamakawa | G06F 3/04847 715/833 |
| 2011/0249029 | A1* | 10/2011 | Baumgart | G09G 5/00 345/619 |
| 2015/0317766 | A1* | 11/2015 | Naganawa | G06T 3/40 345/668 |
| 2016/0044558 | A1* | 2/2016 | Fukada | G09G 5/00 455/509 |
| 2017/0090851 | A1* | 3/2017 | Takano | G09G 3/003 |
| 2017/0329208 | A1* | 11/2017 | Takahashi | G06F 3/1423 |
| 2019/0027117 | A1* | 1/2019 | Ito | G09G 5/14 |
| 2021/0064198 | A1* | 3/2021 | Yamada | G09G 3/10 |
| 2023/0260131 | A1* | 8/2023 | Chang | G06T 7/0002 382/173 |
| 2023/0298178 | A1* | 9/2023 | Notoshi | G16H 30/20 382/132 |
| 2023/0385007 | A1* | 11/2023 | Kawakami | G06F 3/14 |
| 2025/0095253 | A1* | 3/2025 | Nakagawa | H04N 1/00442 |

* cited by examiner

DISPLAY SYSTEM AND DISPLAY METHOD

CROSS-REFERENCE TO RELATED APPLICATION

This application claims priority to Japanese Patent Application No. 2024-178246 filed on Oct. 10, 2024. The disclosure of the above-identified application, including the specification, drawings, and claims, is incorporated by reference herein in its entirety.

BACKGROUND

1. Technical Field

The present disclosure relates to a display system and a display method.

2. Description of Related Art

Japanese Unexamined Patent Application Publication No. 2015-210491 (JP 2015-210491 A) describes an image display system. In the image display system that is described in JP 2015-210491 A, when processing information is associated with an image that is an object of display, an image prior to image processing is displayed and thereafter an image following the image processing is displayed.

SUMMARY

Now, there are cases in which image processing is be used as preprocessing for executing sample analysis using images. In this case, in order to appropriately execute the sample analysis, a user needs to appropriately select a technique for image processing.

For example, in a case where a configuration is employed in which images prior to and following image processing are displayed in a time series, as in the image display system that is described in JP 2015-210491 A, it is difficult for the user to comprehend change due to the image processing, and it is difficult to select appropriate image processing.

In other words, in a situation in which sample analysis using images is executed, it is difficult for the user to realize effects of the image processing as preprocessing, and accordingly, there is a problem that the user cannot easily select the image processing for appropriately executing the analysis.

The present disclosure has been made to solve such problems, and an object thereof is to provide a display control system and a display method that enable a user to easily select image processing for appropriately executing analysis.

A display system according to the present disclosure includes:

- an acquisition unit for acquiring image data of a sample that is an object of analyzing,
- an image processing unit that executes image processing with respect to the image data, and
- a display control unit for displaying an image display region that is divided into a first region and a second region at a boundary line.

The display control unit displays the boundary line so as to be movable by a user operation,

- displays, in the first region, a portion corresponding to a position of the first region out of the image data prior to execution of the image processing, and
- displays, in the second region, a portion corresponding to a position of the second region out of the image data following execution of the image processing.

According to such a configuration, the display system according to the present disclosure can enable the user to easily confirm changes in the image that is the object of analyzing, by the image processing. As a result, the display system according to the present disclosure enables the user to easily select the image processing for appropriately executing the analysis.

In the display system according to the present disclosure,

- the image processing unit may sequentially execute a plurality of types of image processing with respect to the image data.

The display control unit then may

- display, in the first region, a portion corresponding to a position of the first region out of the image data prior to execution of image processing that is selected by a user from the types of image processing, and
- display, in the second region, a portion corresponding to a position of the second region out of the image data following execution of image processing that is selected by the user from the types of image processing.

In the display system according to the present disclosure, the display control unit may

- display, in a juxtaposed manner, an identification image corresponding to each of the types of image processing, and
- deem the preprocessing corresponding to the identification image that is selected by the user to be the image processing that is selected by the user.

In the display system according to the present disclosure, the display control unit may further display, in a vicinity of the image display region, a switching image for switching the image data to be displayed in the image display region.

A display method according to the present disclosure includes:

- acquiring image data of a sample that is an object of analyzing,
- executing image processing with respect to the image data, and
- displaying an image display region that is divided into a first region and a second region at a boundary line.

In the image display region,

- the boundary line is displayed so as to be movable by a user operation,
- a portion corresponding to a position of the first region out of the image data prior to execution of the image processing is displayed in the first region, and
- a portion corresponding to a position of the second region out of the image data following execution of the image processing is displayed in the second region.

According to the present disclosure, a display control system and a display method can be provided that enable a user to easily select image processing for appropriately executing analysis.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

First Embodiment

Configuring the Display System

Hereinafter, a first embodiment according to the present disclosure will be described in detail with reference to the drawings.

First, the configuration of the display system according to the present embodiment will be described in detail.

The display system according to the present embodiment is a system configured as a part of the analysis system according to the present embodiment, and is a system for displaying, to a user, a process of preprocessing for the analysis system according to the present embodiment to execute analysis.

Figure 1:
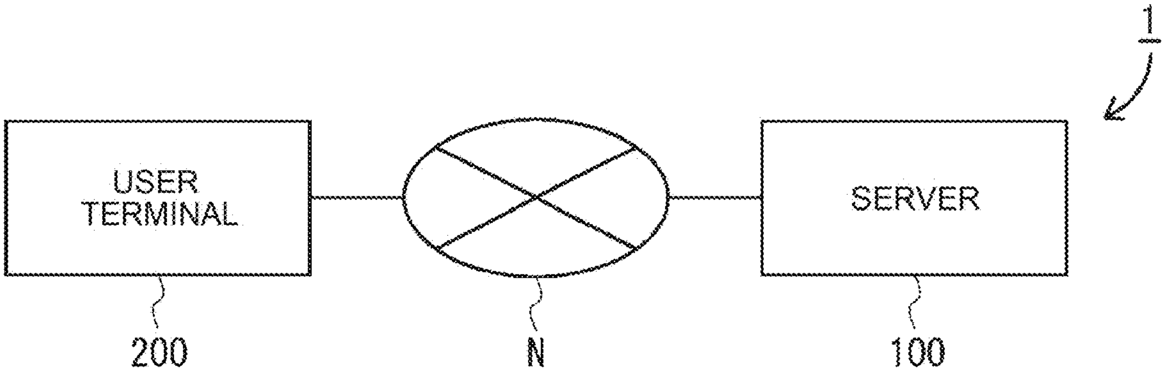
FIG. 1 is a block diagram illustrating a configuration of an analysis system according to a first embodiment.

FIG. 1 is a block diagram illustrating a configuration of an analysis system according to a first embodiment. As illustrated in FIG. 1, the analysis system 1 according to the present embodiment is connected to a server 100 and a user terminal 200 via a network N such as the Internet.

The analysis system 1 is a system for analyzing data to be analyzed.

The analysis system 1 according to the present embodiment is typically provided as a part of a data cloud type service used in sample development or research and development. The analysis system 1 according to the present embodiment is used as a so-called material informatics (MI, Materials Informatics) or a system for promoting R&D using data science. In this case, the analysis system 1 stores, for example, various measurement data of the newly developed sample. Then, the analysis system 1 analyzes the stored measurement data based on an instruction from the user.

In the analysis system 1, the user terminal 200 transmits image data to be analyzed to the server 100, and the server 100 analyzes the received image data. Then, the server 100 transmits the analysis result to the user terminal 200, and the user terminal 200 displays the received analysis result.

The user terminal 200 according to the present embodiment is a terminal operated by a user, and is typically a computer device having a display device.

The user terminal 200 transmits the analysis target data to the server 100 via the network N. Then, the user terminal 200 receives the analysis result of the analysis target data from the server 100 via the network N.

The server 100 according to the present embodiment receives analysis target data from the user terminal 200 and analyzes the received analysis target data. Then, the server 100 transmits the analysis result to the user terminal 200 via the network N.

Figure 2:
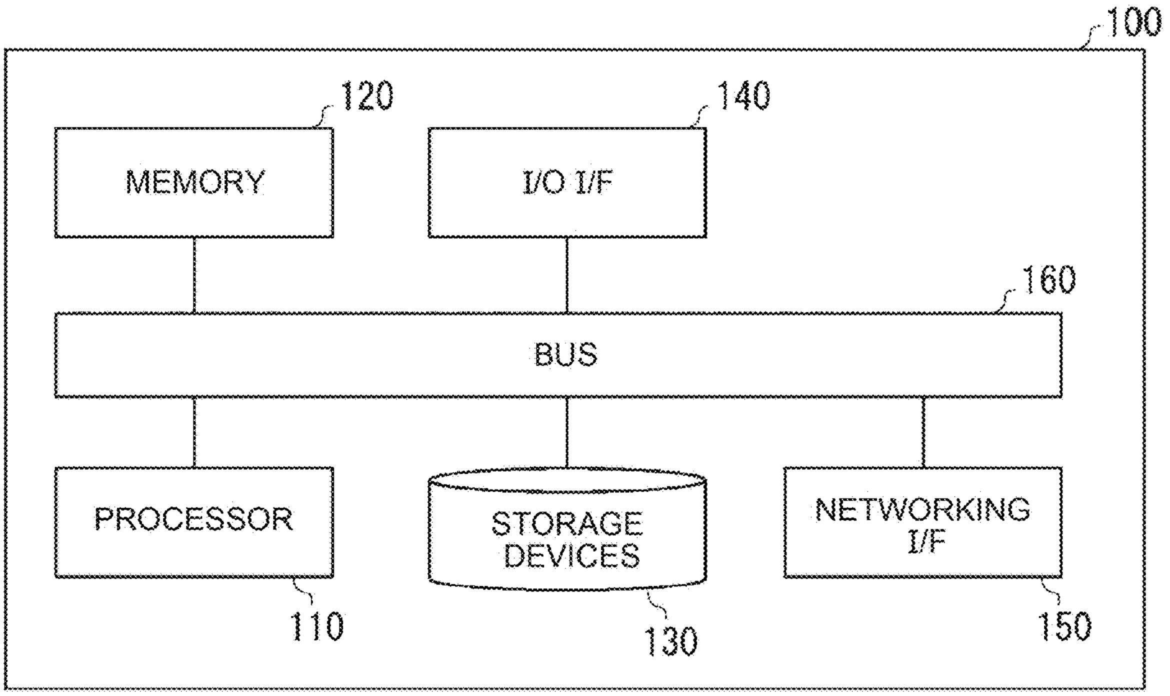
FIG. 2 is a block diagram illustrating a hard configuration of the server according to the first embodiment.

FIG. 2 is a block diagram illustrating a hard configuration of the server according to the first embodiment.

As illustrated in FIG. 2, the server 100 includes a processor 110, a memory 120, a storage device 130, an input/output interface 140, a network interface 150, and an internal bus 160.

The internal bus 160 is a data transmission path through which the processor 110, the memory 120, the storage device 130, the input/output interface 140, and the network interface 150 transmit and receive data to and from each other. However, the method of connecting the processors 110 and the like to each other is not limited to the bus connection.

The memory 120 is a main storage device realized by using RAM (Random Access Memory).

The storage device 130 is an auxiliary storage device realized by using a hard disk, an SSD (Solid State Drive), a memory card, a ROM (Read Only Memory), or the like. The storage device 130 stores a program for realizing a desired function.

The processor 110 is a variety of processors, such as CPU (Central Processing Unit), GPU (Graphics Processing Unit), or FPGA (field-programmable gate array). The processor 110 reads a program stored in the storage device 130 into the memory 120 and executes the program, thereby executing functions as functional blocks illustrated in FIG. 3 and FIG. 4, which will be described later.

The input/output interface 140 is an interface for connecting the server 100 and the input/output device. For example, an input device such as a keyboard or an output device such as a display device may be connected to the input/output interface 140.

The network interface 150 is an interface for connecting the server 100 to a network.

It should be noted that the program includes instructions (or software code) for causing a computer to perform one or more of the functions described in the embodiments when loaded into the computer. The program may be stored in a non-transitory computer-readable medium or a tangible storage medium. By way of example, and not limitation, computer-readable media or tangible storage media include RAM, ROM, flash memory, SSD or other memory techniques, CD-ROM, DVD (digital versatile disc), Blu-ray disk or other optical disk storage, magnetic cassettes, magnetic tape, magnetic disk storage, or other magnetic storage devices. The program may be transmitted on a transitory computer readable medium or a communication medium. By way of example, and not limitation, transitory computer-readable media or communication media include electrical, optical, acoustic, or other forms of propagated signals.

Here, the server 100 according to the present embodiment performs various types of image processing on the image data as pre-processing based on an instruction from the user before performing analysis of the image data.

The display system according to the present embodiment is a system for a user to appropriately select the above-described image processing, and is realized as a part of the function of the server 100.

Figure 3:
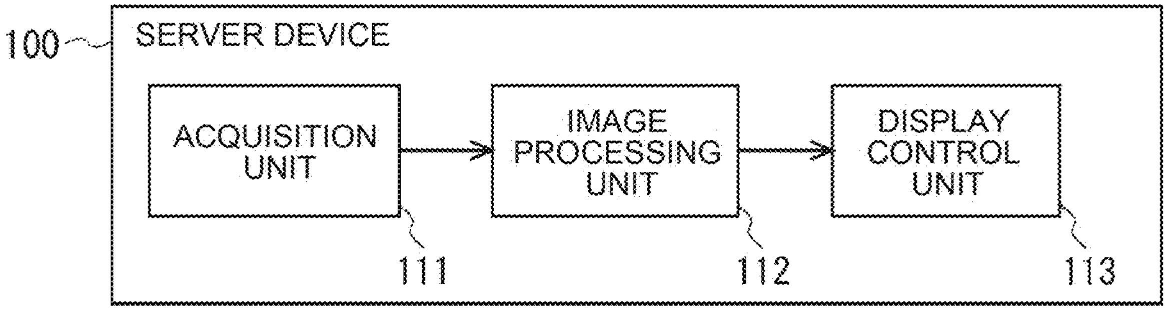
FIG. 3 is a block diagram illustrating a functional configuration of a server according to the first embodiment.

FIG. 3 is a block diagram illustrating a function of the server according to the first embodiment.

As illustrated in FIG. 3, the server 100 according to the present embodiment includes an acquisition unit 111, an image processing unit 112, and a display control unit 113 as functional blocks.

The acquisition unit 111 acquires image data to be analyzed. More specifically, the acquisition unit 111 according to the present embodiment acquires image data from the user terminal 200 via the network N. The acquisition unit 111 outputs the acquired image data to the image processing unit 112.

Here, when image data is received from the user terminal 200, the acquisition unit 111 may store the acquired image data in the storage device 130. When the designation of the image data is received from the user, the designated image data may be read from the storage device 130 and output to the image processing unit 112.

That is, the acquisition unit 111 may create a database in which the image data is stored. The acquisition unit 111 may be configured so that the user can appropriately select the image data to be analyzed from the created database.

The image processing unit 112 performs image processing on the image data.

Specifically, the image processing unit 112 acquires image data from the acquisition unit 111 and receives the type of image processing to be executed from the user. Then, the image processing unit 112 executes the image processing received from the user on the image data. The image processing unit 112 outputs the image data subjected to the image processing to the display control unit 113.

Note that the image processing unit 112 may perform a plurality of image processing on the image data. In this case, the image processing unit 112 receives a plurality of image processes and an execution order of the plurality of image processes from the user. Then, the image processing unit 112 sequentially executes a plurality of image processes on the image data in accordance with the execution order received from the user.

The display control unit 113 controls a display screen of the user terminal 200. More specifically, the display control unit 113 causes the user terminal 200 to display an image processing selection screen for the user to select the image processing and an image processing confirmation screen for the user to confirm the effect of the image processing.

Figure 4:
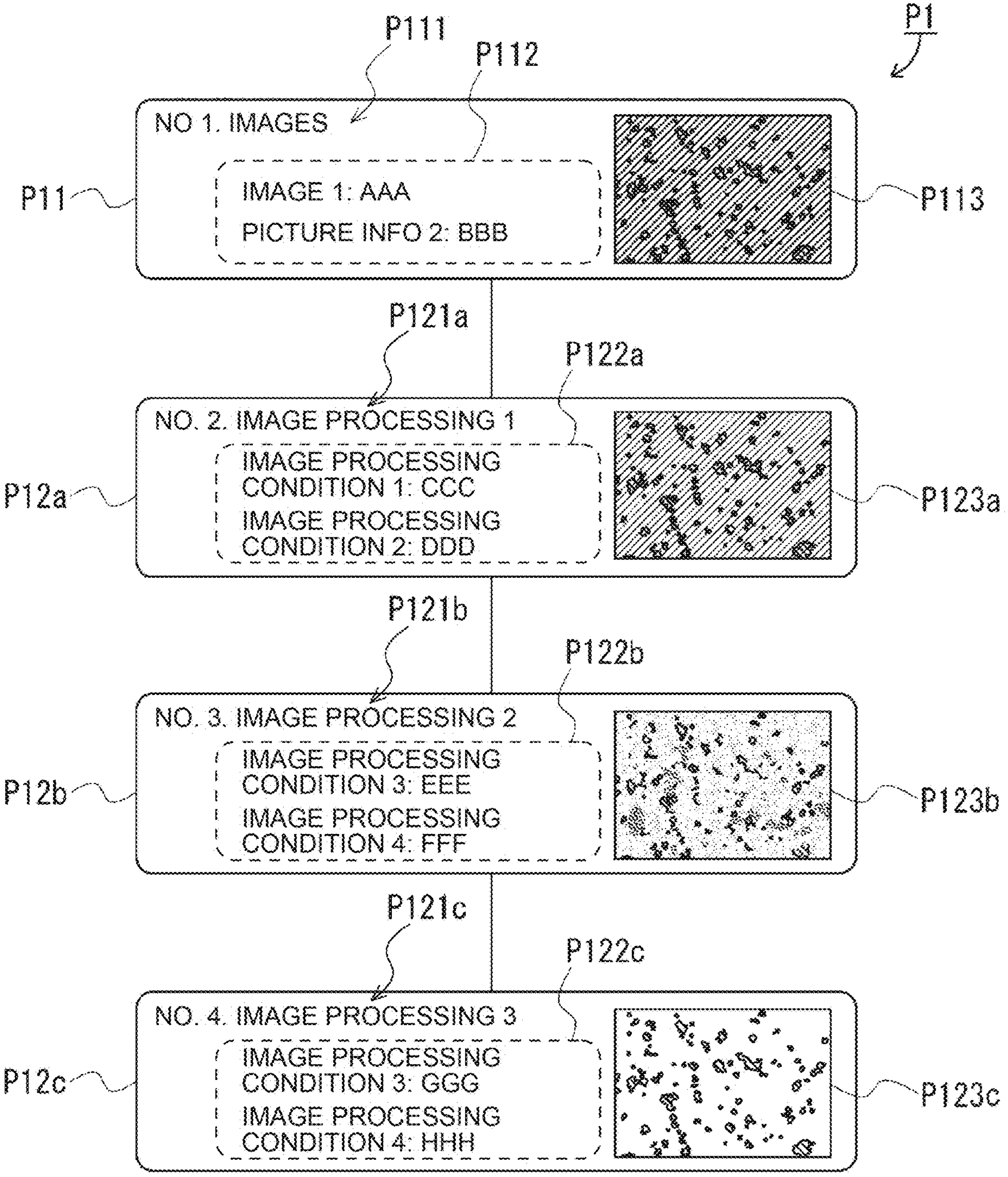
FIG. 4 is a schematic diagram illustrating a configuration of a display control unit according to the first embodiment.
Figure 5:
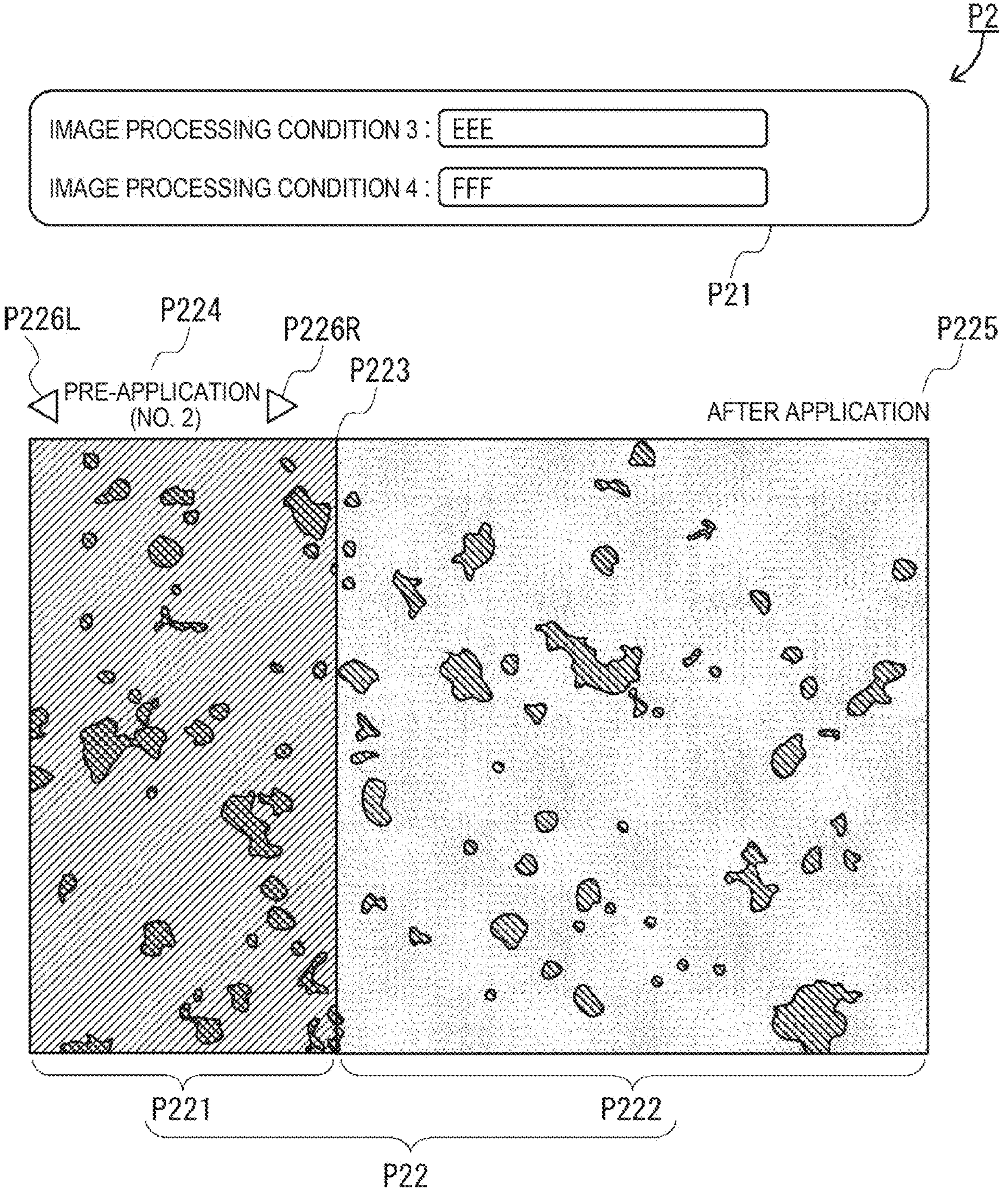
FIG. 5 is a schematic diagram illustrating a configuration of a display control unit according to the first embodiment.

FIG. 4 and FIG. 5 are schematic diagrams illustrating a configuration of a display control unit according to the first embodiment.

More specifically, FIG. 4 is a schematic diagram illustrating an image processing selection screen P1 displayed on the user terminal 200 by the display control unit 113 according to the present embodiment. FIG. 5 is a schematic diagram illustrating an of an image processing confirmation screen P2 displayed on the user terminal 200 by the display control unit 113 according to the present embodiment.

Hereinafter, the image processing selection screen P1 and the image processing confirmation screen P2 will be described with reference to FIG. 4 and FIG. 5.

As illustrated in FIG. 4, the display control unit 113 displays an image processing selection screen P1 in which identification image P11 representing image data before image processing, identification image P12*a*, P12*b* corresponding to each of the plurality of image processing, and P12*c* are displayed in parallel.

Although three image processing are described as an example in FIG. 4, it should be understood that the number of image processing to be executed is not limited to three.

In addition, in the following specification, the identification image P12*a*, P12*b* and P12*c* are simply referred to as identification image P12 unless otherwise required to be distinguished. The same applies to the identification name P121, the image processing-condition P122, the sample image P123, and the switching image P226, which will be described later.

The identification image P11 of the image data is an image representing the image data before the image processing. In the identification image P11, the identification name P111 and the image information P112 are displayed as texts. In addition, a sample image P113 is displayed on the identification image P11.

The identification name P111 indicates that the identification image P11 is associated with the image data before the image processing. For example, FIG. 4 shows that the identification image P11 is associated with the image data before the image processing by displaying the text "input image" as the identification name P111. The identification name P111 may be, for example, a specific name of the image data before the image processing.

The image information P112 is text representing information on the image data before the image processing. The image information P112 may display various kinds of information such as a data size of the image data, a size of the image, a date and time when the user stored the image data, and a comment of the user.

In the sample image P113, an image prior to the image processing is displayed. In the sample image P113, a part of the image before the image processing may be displayed, or all of the images before the image processing may be displayed.

The identification image P12 of the image processing is an image for identifying the image processing to be executed on the image data. In the identification image P12, the identification name P121 and the image processing-condition P122 are displayed as texts. In addition, a sample image P123 is displayed on the identification image P12.

The identification name P121 indicates which image processing the identification image P12 is associated with. For example, FIG. 4 shows that the identification image P12 is associated with the image processing named "image processing 1" by displaying the text "image processing 1" as the identification name P121. The identification name P121 may include, for example, specific names of image processing such as "noise-removal" and "auto-contrast-adjustment".

In the image processing condition P122, a text indicating a condition to be referred to when the image processing is executed is described. In the image processing condition P122, for example, parameters required for executing the image processing may be displayed.

The sample image P123 displays an image after the corresponding image processing is executed. In the sample image P123, a part of the image after the image processing may be displayed, or all of the image after the image processing may be displayed.

Here, the identification image P12 is displayed in parallel in the order in which the corresponding image processing are executed. That is, in the cases as shown in FIG. 4, the image processing corresponding to the identification image P12*a* is executed first, the image processing corresponding to the identification image P12*b* is executed second, and the image processing corresponding to the identification image P12*c* is executed third.

Further, the image processing selection-screen P1 is configured to be editable by user manipulation. For example, the image processing selection screen P1 is configured to be able to edit the type of image processing to be executed, the execution order of the image processing, and the like by a user operation.

In this case, the user executes the editing operation on the image processing selection screen P1 so that the identification image P12 associated with the desired image processing is displayed side by side in the desired execution order.

Then, the image processing unit 112 performs image processing by referring to the image processing selection screen P1 edited by the user.

Here, when any one of the identification image P12 is selected by the user, the display control unit 113 transitions the screen to be displayed on the user terminal 200 to the image processing confirmation screen P2.

Hereinafter, the image processing confirmation screen P2 will be described in detail, assuming that the user has selected the identification image P12*b* in the image processing selection screen P1 illustrated in FIG. 4.

As illustrated in FIG. 5, the display control unit 113 displays the condition displaying region P21 for displaying the image processing condition and the image display region P22 for displaying the image before and after the image processing in parallel on the image processing confirmation screen P2.

In the condition displaying region P21, a text indicating a condition to be referred to when the image processing is executed is described. The conditions described in the condition displaying region P21 are the same as the conditions described in the image processing conditions P122 shown in FIG. 4.

Here, the condition-display-region P21 is configured to be editable by user manipulation. When the condition displaying region P21 is edited, the image processing unit 112 executes the image processing based on the edited condition.

The display control unit 113 displays, in the image display region P22, an image before and after the image processing selected by the user is executed.

In the exemplary embodiment illustrated in FIG. 5, the display control unit 113 displays an image before and after executing the image processing "image processing 2" corresponding to the identification image P12*b* illustrated in FIG. 4. That is, the display control unit 113 regards the image processing "image processing 2" corresponding to the identification image P12*b* selected by the user as the image processing selected by the user, and displays the image in the image display region P22.

Here, the image display region P22 is divided into a first region P221 and a second region P222 at the boundary line P223. In the first region P221, the display control unit 113 displays image data that has not yet been subjected to the image processing. In addition, the display control unit 113 displays the image data after the image processing is executed in the second region P222.

More specifically, the display control unit 113 displays, in the first region P221, the part corresponding to the position of the first region P221 in the image data that has not been subjected to the image processing.

Then, the display control unit 113 displays, on the second region P222, the part corresponding to the position of the second region P222 in the image data after the image processing is executed.

Further, in the present embodiment, the display control unit 113 displays the boundary line P223 so as to be movable by a user's manipulation.

Here, the "portion corresponding to the position of the first region P221 among the image data before the image processing is executed" refers to a portion of the image data overlapping with the first region P221 when the "image data before the image processing is executed" is enlarged or reduced to the same size as the image display region P22 and is superimposed on the image display region P22.

Further, the "portion corresponding to the position of the second region P222 among the image data after the image processing is executed" here refers to a portion of the image data overlapping with the second region P222 when the "image data after the image processing is executed" is enlarged or reduced to the same size as the image display region P22 and is superimposed on the image display region P22.

Figure 6:
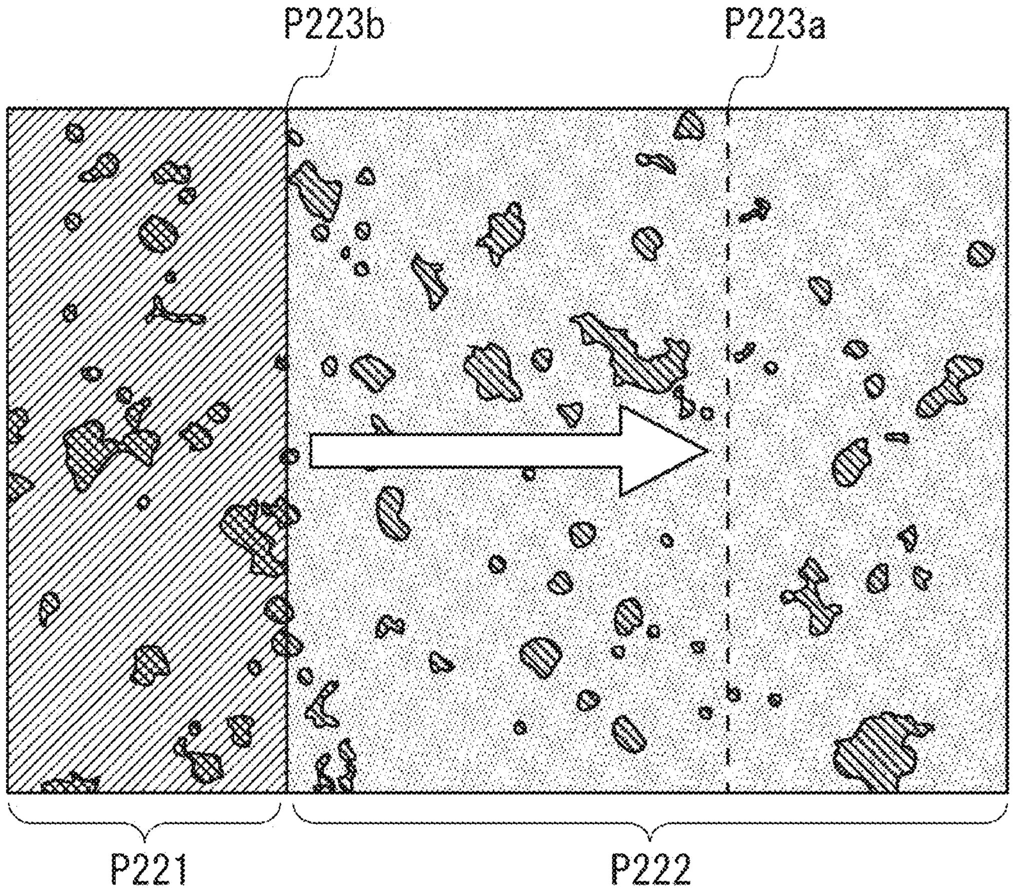
FIG. 6 is a schematic diagram illustrating a configuration of a display control unit according to the first embodiment.
Figure 7:
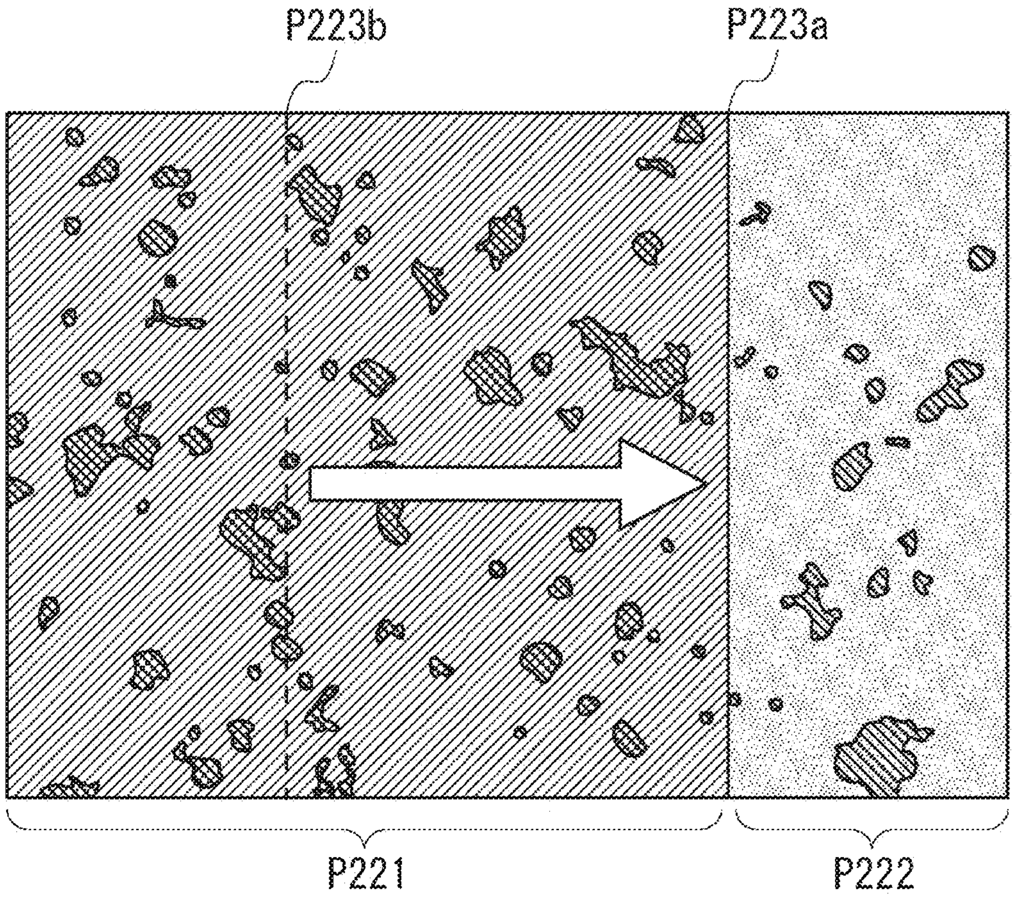
FIG. 7 is a schematic diagram illustrating a configuration of a display control unit according to the first embodiment.

Hereinafter, a change in the displaying mode when the boundary line P223 is moved will be described with reference to FIGS. 6 and 7. FIG. 6 and FIG. 7 are diagrams illustrating changes in the display mode when the boundary line P223 is moved from the position of the boundary line P223*b* prior to the movement to the position of the boundary line P223*a* after the movement. FIG. 6 shows a display mode prior to moving the boundary line P223, and FIG. 7 shows a display mode after moving the boundary line P223.

It should be understood that the direction in which the boundary line P223 is moved is merely exemplary, and is not limited to the directions shown in FIGS. 6 and 7. The boundary line P223 can freely move in the image-region P22 by user manipulation.

As shown in FIGS. 6 and 7, the size of the first region P221 and the size of the second region P222 gradually change by moving the boundary line P223. That is, as the boundary line P223 moves, the region in which the image data after the image processing is displayed gradually changes to the region in which the image data before the image processing is displayed.

According to such a configuration, the user can visually and easily confirm the change in the image data due to the image processing. As a result, the server 100 according to the present embodiment can allow the user to easily select the image processing for appropriately executing the analysis.

The description of FIG. 5 is returned.

The display control unit 113 according to the present embodiment further displays the sign image P224 and P225 in the vicinity of the image display region P22.

The sign image P224 is an image for marking that the image displayed in the first region P221 is an image prior to performing the image processing selected by the user.

Here, in the present embodiment, a sign image P224 such as "No 2" is displayed as the labeled images.

The character string "(No 2)" in the text indicates that the image prior to the execution of the image processing selected by the user is the image data after the execution of the image processing corresponding to the identification image P12*a* in FIG. 4.

The sign image P225 is an image for marking that the image displayed in the second region P222 is an image after the image processing selected by the user has been executed.

Here, in the present embodiment, the sign image P225 is displayed as "after application".

Further, the display control unit 113 according to the present embodiment displays, in the vicinity of the image display region P22, switching image P226 for switching the image data to be displayed in the image display region P22.

When the switching image P226 is selected by the user, the display control unit 113 switches the image processing selected by the user to the image processing one before or one after the image processing in which the executing order is selected.

Here, in the present embodiment, the switching image P226 is selected by the user so that the image data displayed in the first region P221 is switched and the image data displayed in the second region P222 is not switched.

More specifically, when the switching image P226 is selected, the display control unit 113 switches the image data to be displayed in the first region P221 between the image data corresponding to the identification image P11 and the image data after the image processing that is performed in the previous order than the image processing selected by the user.

That is, as illustrated in FIG. 5, when an image corresponding to the identification image P12*b* is displayed in the second region P222, the display control unit P113 can switch between the input image P11 corresponding to the identification image P11 and the image data after the identification image P12*a* is executed, and display the switched image data.

More specifically, when the image displayed in the first region P221 is an input image corresponding to the identification image P11, the image displayed in the first region P221 is switched to the image data after the image processing corresponding to the identification image P12*a* is executed when the user selects the switching image P226R.

Further, when the image displayed in the first region P221 is the image data after the image processing corresponding to the identification image P12*a* is executed, the image displayed in the first region P221 is switched to the inputted image corresponding to the identification image P11 when the user selects the switching image P226L.

The image data after the image processing corresponding to the identification image P12*a* is executed is the same as the image data prior to the image processing corresponding to the identification image P12*b*.

According to such a configuration, it is possible for the user to easily confirm the effect of the image processing when a plurality of image processing is combined. As a result, the user can more easily select the appropriate image processing.

Operation of the Display System

Figure 8:
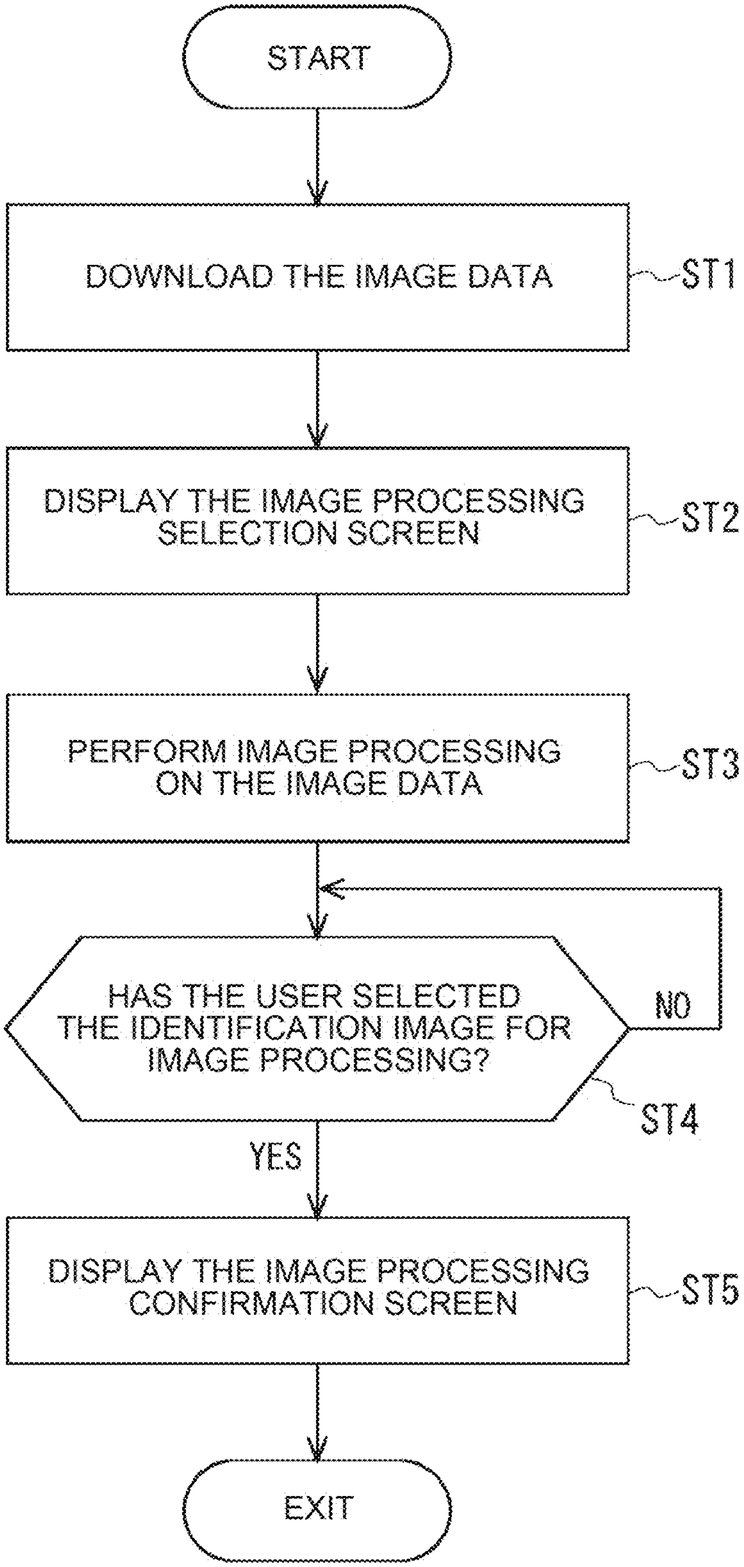
FIG. 8 is a flowchart illustrating an operation of the server according to the first embodiment.

Next, the operation of the display system, that is, the display method according to the first embodiment will be described in detail. FIG. 8 is a flowchart illustrating an operation of the server according to the first embodiment.

In the processing procedure of FIG. 8, the processor 110 of the server 100 functions as the acquisition unit 111, the image processing unit 112, and the display control unit 113 by reading and executing a program stored in the storage device 130 into the memory 120.

In the display method of the present exemplary embodiment, the processor 110 first ST1 the image data. That is, in ST1, the processor 110 functions as the acquisition unit 111.

For example, in ST1, the processor 110 receives a selection of analysis target data to be analyzed from the user terminal 200. Then, the processor 110 acquires the selected plurality of pieces of analysis target data from the storage device 130.

Next, the processor 110 displays an image processing selection screen P1 (ST2). That is, in ST2, the processor 110 functions as the display control unit 113.

More specifically, in ST2, the processor 110 displays an image processing selection window as illustrated in FIG. 4. The processor 110 receives, from the user, editing of the type of image processing to be executed and the execution order of the image processing on the displayed image processing selection screen.

Next, the processor 110 performs an image processing on the image data (ST3). That is, in ST3, the processor 110 functions as the image processing unit 112.

More specifically, in ST3, the processor 110 executes the image processing of the image data based on the type of the image processing to be executed and the execution order of the image processing edited in ST2.

Note that ST2 and ST3 may be steps executed in parallel. That is, the processor 110 may execute the image processing every time the user edits the image processing selection screen P1, and reflect the result of the image processing in the sample image P123 each time.

Processor 110 then determines whether the user has selected an identification image P12 for the image processing (ST4). That is, in ST4, the processor 110 functions as the display control unit 113.

If the user has not selected the identification image P12 of the image processing (ST4 No), the processor 110 re-executes ST4. That is, the processor 110 waits without performing the following steps until the user selects the identification image P12 of the image processing.

When the user selects the identification image P12 of the image processing (ST4YES), the processor 110 displays the image processing confirmation screen P2 (ST5), and the servers 100 terminate the series of operations. In ST5, the processor 110 functions as the display control unit 113.

More specifically, in ST3, the processor 110 displays an image processing confirmation screen P2 including the image display region P22 divided into the first region P221 and the second region P222 in the boundary line P223.

As illustrated in FIG. 5, the image display region P22 is displayed such that the boundary line P223 can be moved by a user operation. In the first region P221, a part corresponding to the position of the first region P221 is displayed in the image data that has not been subjected to the image processing. In the second region P222, a part corresponding to the position of the second region P222 among the image data after the image processing is executed is displayed.

As described above, the server 100 according to the present embodiment, that is, the display system displays the image display region P22 divided into the first region P221 and the second region P222 in the boundary line P223. In the first region P221, a part corresponding to the position of the first region P221 is displayed in the image data that has not been subjected to the image processing. In the second region P222, a part corresponding to the position of the second region P222 among the image data after the image processing is executed is displayed.

According to such a configuration, the user can visually and easily confirm the change in the image data due to the image processing. As a result, the server 100 according to the present embodiment can allow the user to easily select the image processing for appropriately executing the analysis.

Although the present disclosure has been described with reference to the above embodiments, it is to be understood that the disclosure is not limited only to the configuration of the above embodiments, but also includes various modifications, modifications, and combinations that may be made by a person skilled in the art within the scope of the claimed disclosure of the claims of the present application.

What is claimed is:

1. A display system, comprising a display, and a processor configured to:

acquire first image data of a sample to be analyzed;

perform first image processing on the first image data to generate second image data;

perform second image processing on the second image data to generate third image data;

perform third image processing on the third image data to generate fourth image data; and display, on the display, a first screen including a first identification image corresponding to the first image processing, a second identification image corresponding to the second image processing, and a third identification image corresponding to the third image processing in a case where the second identification image is selected, the processor is configured to display, on the display, a second screen including a first region, a second region, a boundary line dividing the first region and the second region, a first switching image, and a second switching image, and the processor is further configured to display, in the first region, a portion corresponding to a position of the first region out of the second image data, and display, in the second region, a portion corresponding to a position of the second region out of the third image data, the boundary line being displayed so as to be movable by a user operation, wherein the processor is configured to display, in the first region, a portion corresponding to the position of the first region out of the first image data, and display, in the second region, a portion corresponding to the position of the second region out of the third image data in a case where the first switching image is selected, and the processor is configured to display, in the first region, a portion corresponding to the position of the first region out of the second image data, and display, in the second region, a portion corresponding to the position of the second region out of the third image data in a case where the second switching image is selected after the first switching image is selected.

2. The display system according to claim 1, wherein the processor is further configured to, in a case where the third identification image is selected, display, in the first region, a portion corresponding to a position of the first region out of the third image data, and display, in the second region, a portion corresponding to a position of the second region out of the fourth image data, in a case where the first switching image is selected, display, in the first region, a portion corresponding to the position of the first region out of the second image data, and display, in the second region, a portion corresponding to the position of the second region out of the fourth image data, and in a case where the second switching image is selected after the first switching image is selected, display, in the first region, a portion corresponding to the position of the first region out of the third image data, and display, in the second region, a portion corresponding to the position of the second region out of the fourth image data.

3. The display system according to claim 1, wherein the processor is further configured to, in a case where the first identification image is selected, display, in the first region, a portion corresponding to a position of the first region out of the first image data, and display, in the second region, a portion corresponding to a position of the second region out of the second image data.

* * * * *